(12) United States Patent
Yamazaki et al.

(10) Patent No.: US 8,185,683 B2
(45) Date of Patent: May 22, 2012

(54) BRIDGE, INFORMATION PROCESSING SYSTEM, AND ACCESS CONTROL METHOD

(75) Inventors: Takeshi Yamazaki, Tokyo (JP); Hideyuki Saito, Tokyo (JP); Yuji Takahashi, Tokyo (JP); Hideki Mitsubayashi, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 133 days.

(21) Appl. No.: 12/282,391

(22) PCT Filed: Jan. 11, 2007

(86) PCT No.: PCT/JP2007/050266
§ 371 (c)(1),
(2), (4) Date: Jan. 6, 2009

(87) PCT Pub. No.: WO2007/105373
PCT Pub. Date: Sep. 20, 2007

(65) Prior Publication Data
US 2010/0070675 A1    Mar. 18, 2010

(30) Foreign Application Priority Data

Mar. 10, 2006  (JP) ................. 2006-066790

(51) Int. Cl.
*G06F 13/36* (2006.01)
*G06F 13/00* (2006.01)
(52) U.S. Cl. .......... 710/306; 710/22; 710/316; 711/147; 711/200; 711/202
(58) Field of Classification Search ............ 710/22, 710/306; 711/147, 200, 202
See application file for complete search history.

(56) References Cited

U.S. PATENT DOCUMENTS

| | | | | |
|---|---|---|---|---|
| 5,887,138 A | * | 3/1999 | Hagersten et al. | 709/215 |
| 6,115,768 A | * | 9/2000 | Yamamoto | 710/107 |

(Continued)

FOREIGN PATENT DOCUMENTS

JP        5-181751 A        7/1993

(Continued)

OTHER PUBLICATIONS

PCI Express Base Specification REvision 1.0a—4 pages; Dated Apr. 15, 2003.*

(Continued)

*Primary Examiner* — Brian Misiura
(74) *Attorney, Agent, or Firm* — Katten Muchin Rosenman LLP (57) ABSTRACT

Transparency of resources is provided and ordering in an access is guaranteed between nodes on a computer network. In an information processing system in which a plurality of processor units are connected to each other by a switch, a global address space is introduced into which effective addresses of the processor units are mapped and which is shared by the plurality of processor units. In response to an access request packet issued by a processor unit and designating an effective address of a target node, a bridge for routing an input and output bus of a processor unit to an input and output bus of the switch converts the effective address of the target node into a global address by appending to the packet a node identification number identifying the target node, and outputs the access request packet designating the global address to the switch. After an access request packet for a write operation is output, the bridge confirms whether the write operation is completed in a target node.

5 Claims, 5 Drawing Sheets

U.S. PATENT DOCUMENTS

| | | | |
|---|---|---|---|
| 7,251,698 B2 * | 7/2007 | Glasco et al. | 709/237 |
| 7,598,958 B1 * | 10/2009 | Kelleher | 345/504 |
| 7,698,493 B2 * | 4/2010 | Asaro | 710/315 |
| 2008/0235430 A1 * | 9/2008 | Boyd et al. | 710/316 |

FOREIGN PATENT DOCUMENTS

| | | |
|---|---|---|
| JP | 8-272754 A | 10/1996 |
| JP | 9-22397 A | 1/1997 |
| JP | 2001-236335 A | 8/2001 |
| JP | 2006008004 | 1/2006 |

OTHER PUBLICATIONS

Notification of Reason(s) for Refusal dated Jan. 6, 2009, from the corresponding Japanese Application.

International Search Report dated Feb. 6, 2007 from the corresponding PCT/JP2007/050266.

International Preliminary Report on Patentability dated Sep. 16, 2008 from the corresponding PCT/JP2007/050266.

* cited by examiner

BRIDGE, INFORMATION PROCESSING SYSTEM, AND ACCESS CONTROL METHOD

TECHNICAL FIELD

The present invention relates to a technology for allowing access from one node to another on a computer network.

BACKGROUND ART

In the related art, nodes communicating on a computer network cannot see each other's resources such as memories and IO devices. Transparency of resources is not secured.

For example, in an Ethernet (registered trademark) network, access from one node to another is achieved via network hardware such as a network interface card (NIC) provided in a node or via a device driver for the hardware, The related-art approach such as this imposes heavy load and high overhead on the system.

In a computer network such as a multiprocessor system where a plurality of processors are connected, for example, one conceivable approach to address lack transparency of resources between processors is to provide a shared memory accessible by the processors so that the processors can deliver data to each other via the shared memory. In this case, however, processor A cannot directly deliver data to processor B. The shared memory approach inherently requires the step of letting processor A to copy data to the shared memory and the step of letting processor B to read the data from the shared memory for copying. Similarly to the aforementioned approach, there could be a problem of overhead.

DISCLOSURE OF THE INVENTION

Problem to be Solved by the Invention

In a Japanese patent application 2006-008004, we proposed a technology of providing transparency of resources between nodes in a computer network. According to the technology, a node can direct access the resources of another node. If a processor issues a read command or a write command in a multiprocessor system to which the proposed technology is applied and in which processors are connected to each other via a bridge, a packet including the command is transferred over a switching network. Therefore, the order of transmission of commands is not guaranteed. We realized that there is room for improvement in respect of controlling the ordering of accesses.

In this background, a general purpose of the present invention is to provide a technology whereby transparency of resources between nodes on a computer network is achieved and the ordering of accesses between nodes can be controlled.

Means to Solve the Problem

The present invention according to at least one embodiment relates to a bridge. The bridge is for routing an input and output bus of a processor unit to an input and output bus of a switching device via which a plurality of processor units are connected to each other. The bridge comprises an upstream port, a controller, and a downstream port.

The upstream port is adapted to a global address space into which effective addresses of the processor units are mapped and which is shared by the plurality of processor units. The upstream port is operative to receive from the associated processor unit an access request packet designating an effective address of a target node represented by one of the plurality of processor units. An effective address indicates a position in an effective address space. An effective address space is an aggregate and combination of memory space parts collected from storage means, including the main memory, located at a plurality of locations in the processor units. An effective memory space corresponds to a processor unit. In other words, there are as many effective memory spaces as there are processor units. Each processor unit uses the associated effective memory space as a work memory. By optimizing the internal configuration of the effective memory space, the associated processor unit can achieve maximum performance.

The controller is provided with a converter operative to convert the effective address of the target node into a global address by appending to the effective address of the target node a node identification number identifying the target node and necessary for switching. The controller is further provided with a confirmation unit operative to confirm, after an access request packet for a write operation is output, whether the write operation is completed in the target node.

The downstream port is operative to output a access request packet designating a global address to the switching device.

The confirmation unit may establish confirmation by generating and allowing the downstream port to output to the switching device an access request packet that designates a global address designated by an access request packet for a write operation and is configured to read from the designated address, and by determining that the read operation is completed.

The controller may be provided with an order guaranteeing unit operative to permit the output of a notification packet issued by the associated processor unit and configured to notify a target node that a write operation is completed, on the condition that confirmation is established that the execution of an access request packet output prior to the notification packet and requesting the write operation in the target node is completed.

Where the global address space is logically partitioned by using application identification numbers uniquely identifying distributed applications run on the plurality of processor units, the converter may be operative to store an application identification number in an access request packet designating a global address.

When the downstream port receives, from a source node represented by one of the plurality of processor units, an access request packet designating the processor unit associated with the downstream port as a target node and designating an effective address of the target node, the converter retrieves an application identification number from the access request packet, and the upstream port delivers to the associated processor unit the application identification number retrieved from the access request packet along with the effective address of the associated processor unit designated in the access request packet.

The present invention according to another embodiment relates to an information processing system. The information processing system comprises a plurality of processor units; a switching device operative to connect the plurality of processor units each other; and a bridge operative to route an input and output bus of an associated processor unit to an input and output bus of the switching device. The bridge may be the aforementioned bridge.

Optional combinations of the aforementioned constituting elements, and implementations of the invention in the form of methods, apparatuses, systems, programs, and recording mediums storing programs may also be practiced as additional modes of the present invention.

Advantage of the Present Invention

The present invention achieves transparency of resources between nodes on a computer network and controlling the ordering of accesses between nodes.

DESCRIPTION OF THE REFERENCE NUMERALS 20 bridge, 21 upstream port, 22 controller, 23 converter, 24 confirmation unit, 25 order guaranteeing unit, 28 downstream port, 30 processor unit, 40 node, 50 switch, 80 switch, 100 node, 110 bridge, 112 first input and output unit, 114 bridge controller, 116 register group, 118 second input and output unit, 120 multicore processor, 130 sub-processor, 132 core, 134 local memory, 136 MFC, 138 DMAC, 140 main processor, 142 core, 144 L1 cache, 145 L2 cache, 146 MFC, 148 DMAC, 150 ring bus, 160 IOIF, 164 IO controller, 170 memory controller, 180 main memory

BEST MODE FOR CARRYING OUT THE INVENTION

Before describing the embodiment of the present invention in detail, a brief summary of the proposed technology will be given.

Figure 1:
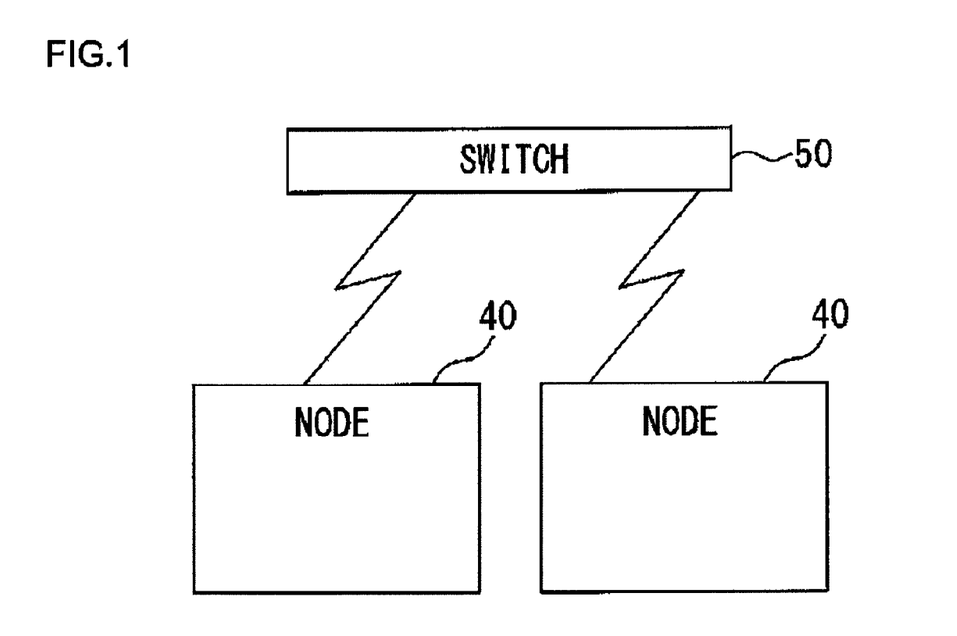
FIG. 1 shows an exemplary information processing system.

The information processing system shown in FIG. 1 will be discussed. The information processing system comprises a plurality of (two, in the illustrated example) nodes 40, which are connected via a switching device (hereinafter, simply referred to as a switch) 50.

Figure 2:
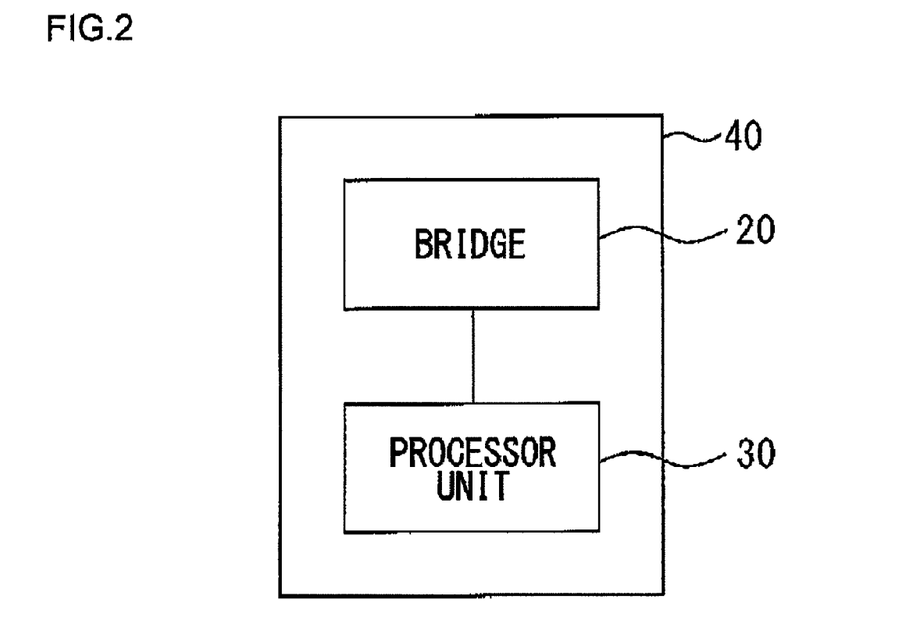
FIG. 2 shows the structure of a node in the information processing system shown in FIG. 1.

FIG. 2 shows the structure of the node 40.

The node 40 comprises a processor unit 30 and a bridge 20 for routing an input and output bus (not shown) of the processor unit 30 to an input and output bus (not shown) of the switch 50. The processor unit 30 may be a single processor or comprise a plurality of processors. Before describing the bridge 20 in detail, a description will be given of a global address space used in the inventive technology.

Figure 3:
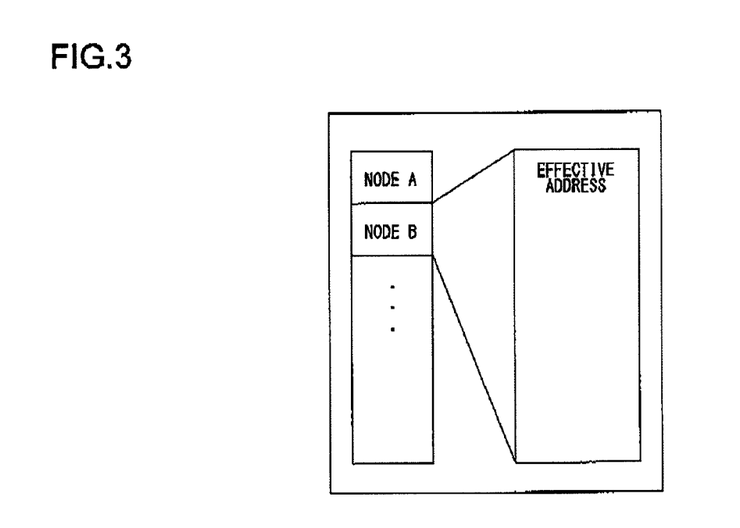
FIG. 3 schematically shows a global address space (part 1)

FIG. 3 schematically shows a global address space. As shown in FIG. 3, the global address space is configured such that the effective address space of each processor unit 30 is mapped into the node to which the processor unit 30 belongs. The global address space is shared by the processor units 30. An address in the global address space will be referred to as a global address.

Access from one node 40 to another is achieved by using the global address space.

In accessing a target node, the processor unit 30 of a source node issues an access request packet designating the effective address of the target node and outputs the packet to the bridge 20. The access request packet is issued by using, for example, a direct memory access (DMA) architecture.

Figure 4:
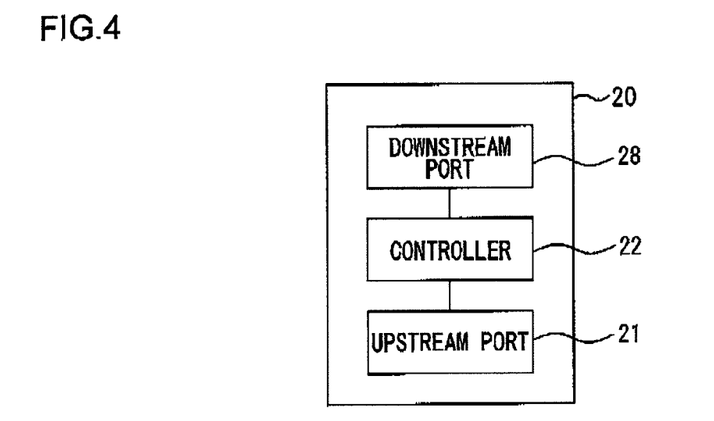
FIG. 4 shows the structure of a bridge in the node shown in FIG. 2.

FIG. 4 shows the structure of the bridge 20. The bridge 20 comprises an upstream port 21 for transmission to and reception from the processor unit 30 via the input and output bus of the processor unit 30, a controller 22, and a downstream port 28 for transmission to and reception from the switch 50 via the input and output bus of the switch 50.

Figure 5:
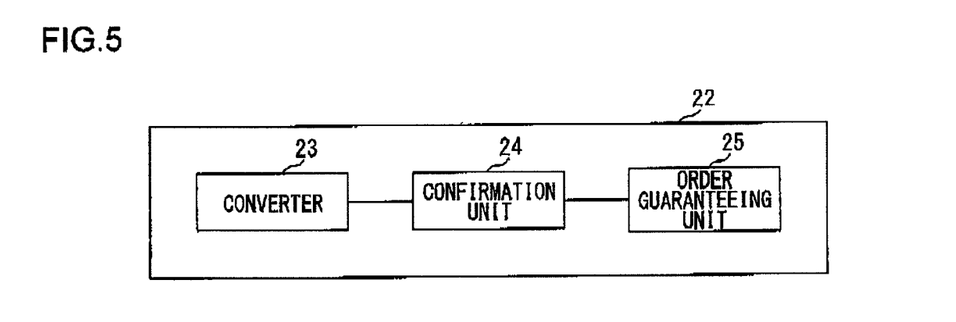
FIG. 5 shows the structure of a controller in the bridge shown in FIG. 4.

FIG. 5 shows the structure of the controller 22. The controller 22 comprises a converter 23, a confirmation unit 24, and an order guaranteeing unit 25.

The upstream port 21 receives an access request packet issued by the processor unit 30. The converter 23 of the controller 22 converts the effective address of the target node into a global address by adding to the effective address of the target node a node identifying number (hereinafter, referred to as node ID) identifying the target node and necessary for switching. The downstream port 28 outputs the access request packet designating the global address to the switch 50. The confirmation unit 24 and the order guaranteeing unit 25 in the controller 22 will be described later.

A node ID indicates a physical location of the node 40 in a network. For example, the ID of a connecting port in the switch 50 to which the node is connected may be used as the node ID.

Figure 6:
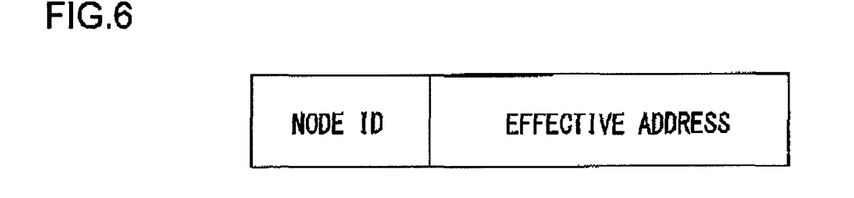
FIG. 6 shows the format of a global address compatible with the global address space shown in FIG. 3.

FIG. 6 shows the format of a global address. As illustrated, a global address comprises a node ID and an effective address.

The downstream port 28 of the bridge 20 outputs the access request packet as illustrated designating a global address to the switch 50. The switch 50 reads the node ID included in the global address of the access request packet thus received and transfers the access request packet to the node 40 connected to the connecting port designated by the node ID.

The downstream port 28 of the bridge 20 of the target node 40 receives the access request packet. The upstream port 21 outputs the effective address designated by the access request packet to the processor 30. In this process, the converter 23 may read the effective address from the global address and deliver it to the upstream port 21. Alternatively, the switch 50 may transfer the access packet such that only the effective address included in the global address is output to the bridge 20 and the intervention of the converter 23 is not required. Alternatively, the access request packet may be delivered to the processor unit 30 as it is so that the processor unit 30 reads the effective address.

The processor unit 30 converts the effective address into a physical address.

Thus, by mapping a portion of the user space into a global address space, transparency of the resources is ensured between nodes on a computer network. With this, access from one to another is achieved without activating network hardware or the device driver for the hardware. Thereby, memory access with reduced overhead is achieved.

Safety may be enhanced by configuring the memory in the processor unit included in each node such that areas are allocated to nodes other than the local node, thereby ensuring that each node can only access the area allocated to the node. More specifically, the bridge 20 of the source node converts into a global address such that the node ID of the source node is also appended in addition to the node ID of the target node. The bridge 20 of the target node delivers the node ID of the source node to the processor unit 30 along with the effective address included in the access request packet. The processor unit 30 determines whether to permit or deny the access, using the node ID of the source node delivered from the bridge.

For example, the processor unit may convert an effective address into a physical address using an address conversion table. The address conversion table stores a permitted identification number indicating permission or denial of access to the physical address space requested to be accessed. For example, the permitted identification number may be the node ID of the access source node to which access to the corresponding physical address space is permitted. In converting an effective address into a physical address by referring to the conversion table, the processor unit may determine whether access to the effective address is permitted by examining whether the node ID of the source of access request delivered from the bridge matches the permitted identification number associated with the effective address in the conversion table.

in this way, where the internal configuration of the effective memory space is optimized such that the processor unit in each node achieves maximum performance, mutual access from one node to another in the effective memory space is facilitated and access to areas allocated to respective nodes by an unauthorized node is prevented. Thereby, safety is ensured.

A consideration will be given of a case where an access request packet is for writing into the memory of the processor unit 30 of the target node. As mentioned above, direct access from one node to another is achieved by introducing a global address space. When directly writing into the memory of the processor unit 30 of the target node, the processor unit 30 of the source node may issue a packet (hereinafter, referred to as notification packet) notifying the processor unit 30 of the target node that writing is done. Upon receipt of the notification packet, the processor unit 30 of the target node knows that data is written and reads the associated data. In order to allow the processor unit 30 of the target node receiving the notification packet to read the data, any of various known technologies such as signal notification register, mail box, polling, and reservation lost event is used to cause an interrupt to the processor.

In network routing, ordering is guaranteed by ensuring that packets designating the same source node and the same address (in this case, the effective address) are transmitted through the same route and subject to the same ordering rule of a bus such as PCI Express (registered trademark) in the route. If the addresses are different, however, ordering is not guaranteed because packets designating the same source node and the same target node may be routed along different routes. A write operation of the processor unit 30 of the source node may be such that an access request packet for a write operation (hereinafter, referred to as a write packet) is followed by a plurality of write operations. In this process, the processor unit 30 issues a notification packet subsequent to the access request packet for the last of the plurality of wiring operations. However, the write packet and the notification packet may be transferred in the reversed order, with the result that the notification packet does not necessarily arrive at the target node subsequent to the preceding write packet. When the notification packet arrives at the target node before the preceding write packet, the processor unit 30 of the target node operates to read data that is not written yet, resulting in reading old data or invalid data.

The confirmation unit 24 and the order guaranteeing unit 25 in the controller 22 of the bridge 20 shown in FIG. 5 are provided to guarantee that notification is performed after the write operation by the preceding write packet is completed. The confirmation unit 24 confirms whether the write operation by the write packet is completed after each write packet is output. A consideration will be given of a case where a command (e.g., posted write) that is often used in direct access write and that does not receive notification from a target node after the write packet is output as to whether the write operation is done. In this case, the confirmation unit 24 performs a read operation in order to confirm whether the write operation by the write packet is completed. For this purpose, the unit 24 generates an access request packet (hereinafter, referred to as a confirmation packet) including a read command designating the same global address as designated by the write packet, and outputs the packet thus generated via the downstream port 28. The confirmation packet is transmitted in the non-posted read mode, where an error is returned when the execution fails in the source node.

In this process, it is preferable that the confirmation packet reads 0 packets in order to reduce the volume of processes in the source node and the target node and to reduce the amount of data flowing over the network.

PCI requires by rule that non-posted read does not overtake posted write. Therefore, unless the write operation by the preceding write packet is completed, the read operation by the confirmation packet cannot be performed. Upon receipt of an error indicating that the read operation by the confirmation packet fails, the confirmation unit 24 knows that the preceding write operation is not completed. By receiving acknowledgement indicating the success of read operation, the confirmation unit 24 confirms that the preceding write operation is completed.

As mentioned above, the processor 30 of the source node issues a notification packet subsequent to the write packet and outputs the packet to the bridge 20, to notify the processor unit 30 of the target node that write operation is done. The notification packet designates the same node as the target node designated by the preceding write packet.

Upon receipt of the notification packet from the processor unit 30 of the source node, the bridge 20 controls the output of the notification packet, using the order guaranteeing unit 25 of the controller 22. More specifically, the order guaranteeing unit 25 permits the output of the notification packet on the condition that result of confirmation by the confirmation unit 24 using the confirmation packet indicates that the write operations by the write packets issued prior to the notification packet and designating the same address are completed.

The address designated by the confirmation packet and the notification packet output to the switch 50 is a global address, as in the case of the other access request packets. The confirmation unit 24 may directly generate a confirmation packet, designating a global address. Alternatively, the confirmation unit 24 may generate a confirmation packet, designating an effective address so that the converter 23 converts the effective address into a global address, as in the case of other access request packets.

In this way, the conformation unit 24 and the order guaranteeing unit 25 ensure that the notification packet is output after the write operation is completed.

A description will be given of a case where the technology is applied to a distributed application system capable of allowing a plurality of nodes on a network to process the same application.

In this case, in the nodes running applications, or, more specifically, in the memories of the processor units included in the nodes, areas are allocated to the respective applications being run. The proposed technology facilitates access from an application being run on different nodes in a distributed application system to the areas allocated to the application.

For this purpose, an application identification number (hereinafter, referred to as application ID or APID) is introduced. The global address space shown in FIG. 3 is logically partitioned by using application IDs.

An application ID is assigned to each application being run and uniquely identifies the associated application throughout the system. In other words, the same application being run on a plurality of different nodes has the same application ID.

Figure 7:
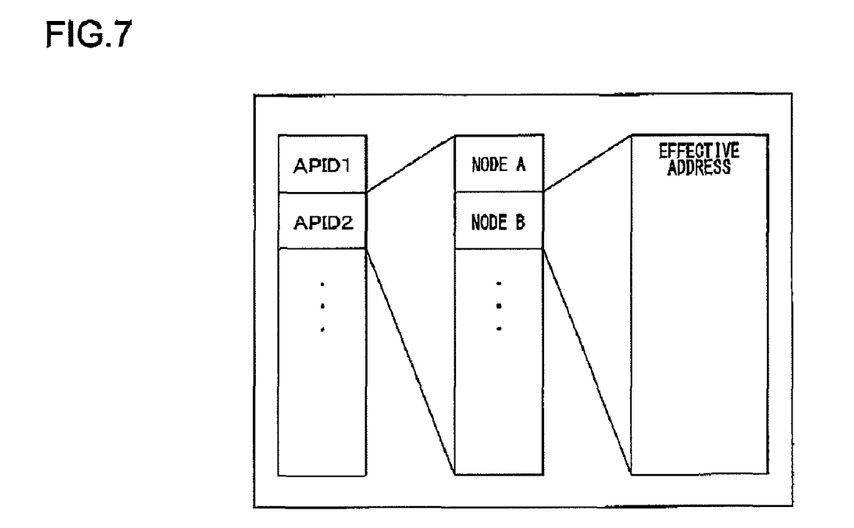
FIG. 7 schematically shows a global address space (part 2)

FIG. 7 shows the concept of global address space in this case. The rightmost address space is an effective address space corresponding to a node or an application being run on the node. The address space at the center is an aggregate of effective address spaces corresponding to the same application located at a plurality of locations in the information processing system. The leftmost address space is an aggregate of address spaces corresponding to the applications in the information processing system.

A description will be given of access occurring in this case from one to another using the system configuration shown in FIG. 1. In accessing the target node, the processor unit 30 of the source node issues an access request packet designating the effective address of the target node and outputs the packet to the bridge 20.

The converter 23 of the bridge 20 converts the effective address of the target node into a global address by adding to the effective address of the target node the APID and the node ID of the target node. The converter 23 outputs the access request packet designating the global address to the switch 50 via the downstream port.

Figure 8:
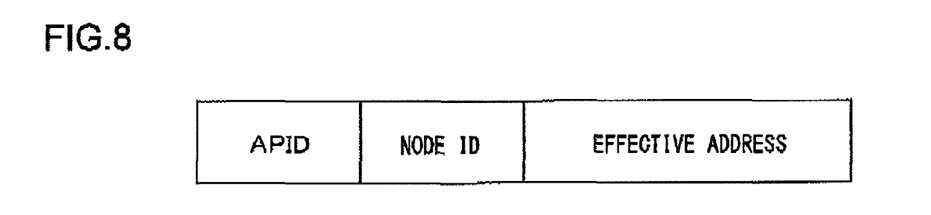
FIG. 8 shows an exemplary format of a global address space compatible with the global address space shown in FIG. 7.

FIG. 8 shows an exemplary format of a global address. As shown, the global address comprises the APID, the node ID of the target node, and the effective address.

The format of global address may not be as illustrated in FIG. 8. What is required is that the APID is included in the access request packet and can be read by the bridge 20 of the target node. For example, the format shown in FIG. 6 may be used as the format of global address and the APID may be stored in the access request packet.

Upon receipt of the access request packet, the bridge 20 of the node 40, which is the target node, reads the APID from the access request packet and delivers the effective address designated by the access request packet to the node 40 along with the APID.

The processor unit 30 converts the effective address into a physical address in an area allocated to the application corresponding to the APID.

Thus, by using the APIDs to logically partition the global space in which are mapped the effective addresses of the nodes, and appending the APID in the global address or storing the APID in the access request packet, user applications can easily access the memory space used by the application across nodes. In this case, it is preferable that the processor unit determine whether the access is permitted using the APID delivered from the bridge.

For example, the processor unit may convert an effective address into a physical address using an address conversion table. The address conversion table stores a permitted identification number indicating permission of access to the physical address space requested to be accessed. For example, the permitted identification number may be the APID to which access to the corresponding physical address space is permitted. When converting the effective address into the physical address by referring to the conversion table, the processor unit may determine whether access to the effective address is permitted by examining whether the APID delivered from the bridge matches the permitted identification number associated with the effective address in the conversion table.

In this way, where an application is being run on different nodes and the internal configuration of the effective memory spaces is optimized in each node such that the processor unit or the application achieves maximum performance, mutual access from one node to another in the effective memory spaces is facilitated and access to an area allocated to a given application from a different application is prevented. Thereby, safety is ensured.

By allowing the processor unit to convert the effective address into the physical address, the structure of the bridge is simplified. An added advantage from this is that the processor unit can adjust the conversion table independent of the bridge. Another advantage is that the bridge of the same structure can be used to enable access from one node to another even if nodes with different IO devices or different memory sizes, are co-located.

In this case, too, the confirmation unit 24 and the order guaranteeing unit 25 of the bridge 20 can guarantee that the notification packet indicating a write operation is output after the write operation by the preceding write packet is completed.

The system embodying the above-mentioned features will now be described.

Figure 9:
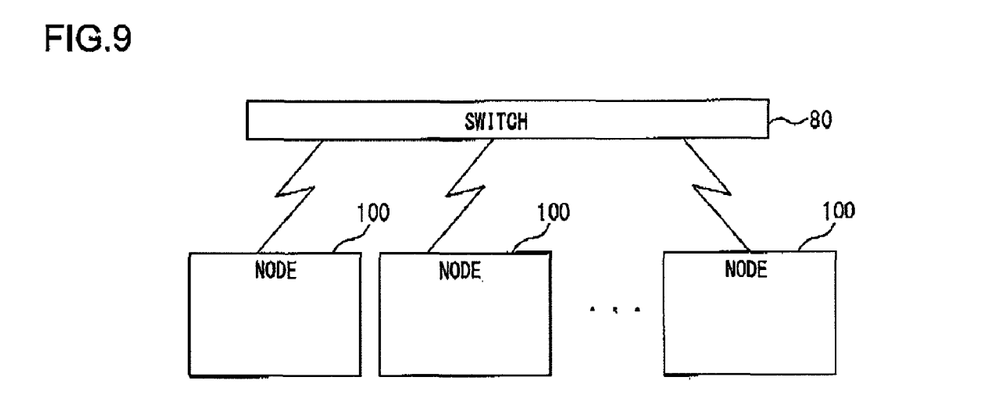
FIG. 9 shows the structure of an information processing system according to an embodiment of the present invention.

FIG. 9 shows the structure of an information processing system according to an embodiment of the present invention. The information processing system comprises a plurality of nodes 100 and a switch 80 that connects the nodes to form a network. The node 100 is connected to the switch 80 via a connecting bus (not shown). The connecting bus may be a PCI bus. The switch 80 is formed as, for example, a PCI-PCI bridge. The PCI bus may be of a specification defined in any of PCI, PCIX, and PCI Express (registered trademark).

Figure 10:
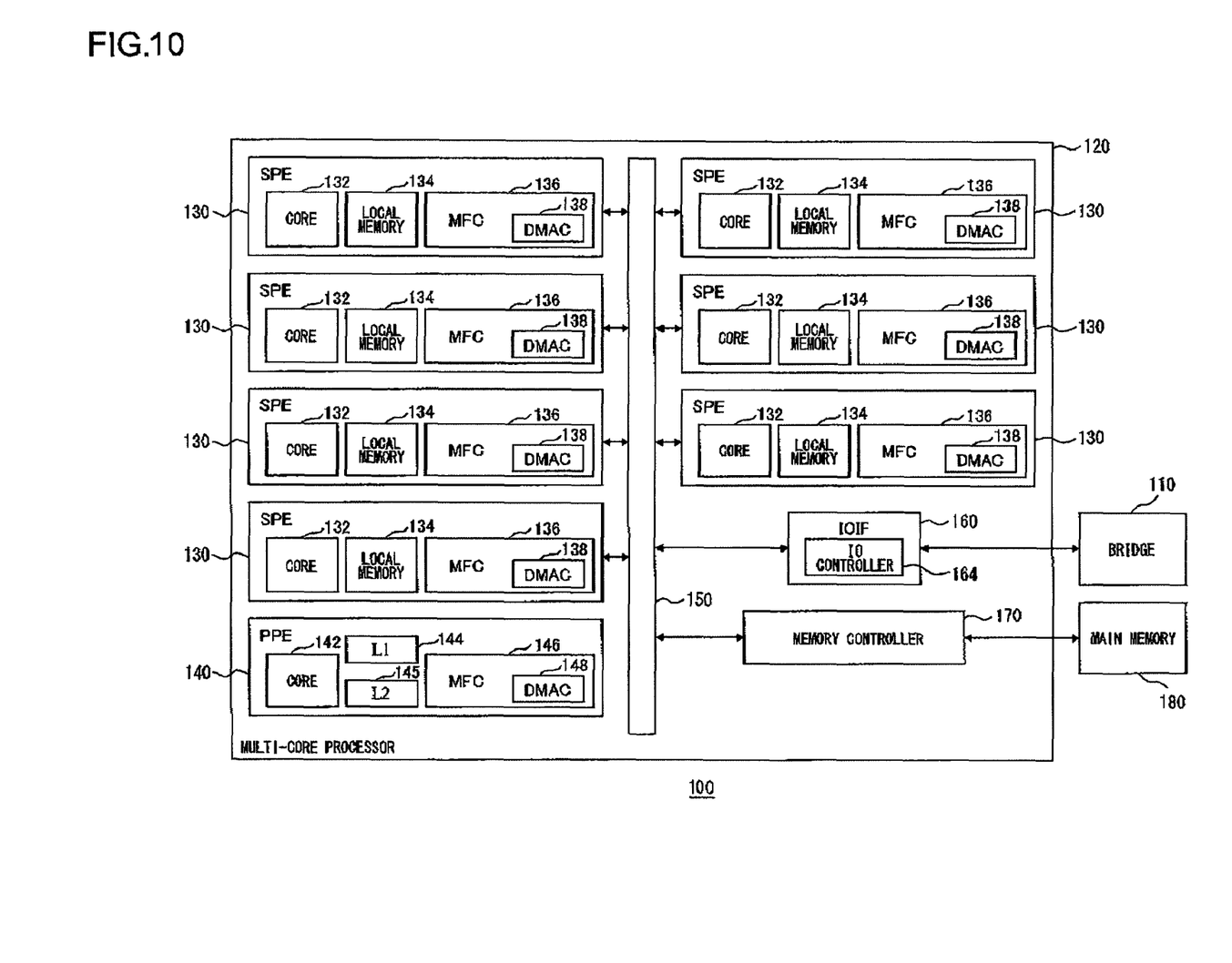
FIG. 10 shows an exemplary structure of a node in the information processing system shown in FIG. 9.

FIG. 10 shows an exemplary structure of the node 100 in the information processing system shown in FIG. 9. The node 100 comprises a bridge 110, a multicore processor 120, and a main memory 180.

The multicore processor 120 is formed as a single chip. The processor 120 comprises a main processing unit, i.e., a power processing element (PPE), 140, a plurality of (eight, in the illustrated example) sub-processing units, i.e., synergistic processing elements, 130, an IOIF 160, and a memory controller 170. These components are connected via a ring bus 150.

The main memory 180 is a memory shared by the processing units in the multicore processor 120 and is connected to the memory controller 170.

The memory controller 170 mediates access from the PPE 140 and each SPE 130 to the main memory 180. In the example illustrated in FIG. 10, the main memory 180 is provided outside the multicore processor 120. Alternatively, the memory 180 may be provided inside the multicore processor 120.

The IOIF 160 is connected to the bridge 110 via an IOEF bus (not shown) and cooperates with the bridge 110 to enable access from one node 100 to another. The IOIF 160 includes an IO controller 164.

The SPE 130 comprises a core 132, a local memory 134, and a memory flow controller (hereinafter, referred to as MFC) 136. The MFC 136 includes a direct memory access controller (DMAC) 138. Preferably, the local memory 134 is not a related-art hardware cache memory because elements for achieving the hardware cache memory functions such as a hardware cache circuit located inside or outside the chip, a cache register, and a cache memory controller are not provided.

The PPE 140 includes a core 142, an L1 cache 144, an L2 cache 145, and an MFC 146. The MFC 146 includes a DMAC 148.

Normally, the operating system (hereinafter, also referred to as OS) of the multicore processor 120 operates in the PPE 140. The basic process of the OS determines a program run on each SPE 130. The program run on the SPE 130 may be a program that forms a part of the OS (e.g., a device driver or a part of the system program). The instruction set architectures of the PPE 140 and that of the SPE 130 include different instruction sets.

The information processing system shown in FIG. 9 is a distributed application system in which the same application can be run on a plurality of multicore processors 120. In this system, the global address space shown in FIG. 7 is used.

Figure 11:
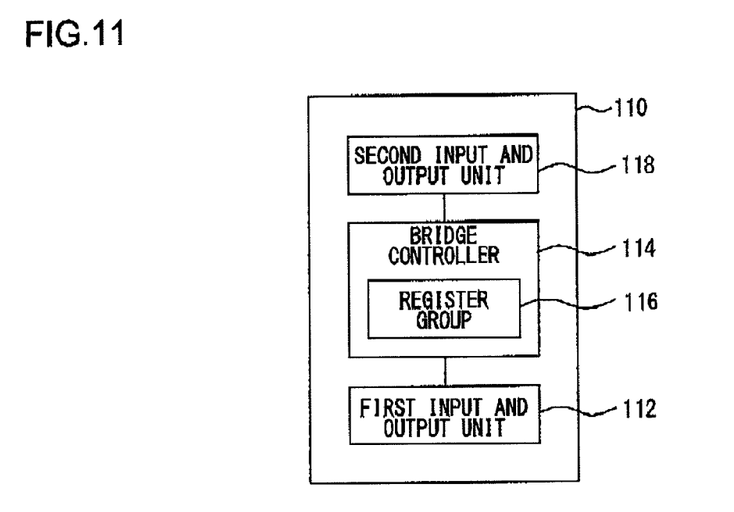
FIG. 11 shows the structure of the bridge in the node shown in FIG. 10.

FIG. 11 shows the structure of the bridge 110. The bridge 110 comprises a first input and output unit 112, a bridge controller 114, and a second input and output unit 118. The bridge controller 114 includes a register group 116.

The first input and output unit 112 and the second input and output unit 118 are the same as the upstream port 21 and the downstream port 28 of the bridge 20 shown in FIG. 4, respectively, so that the detailed description is omitted.

When the bridge controller 114 belongs to a source node, the bridge controller 114 converts the effective address designated by the access request packet issued by the multicore processor 120 into a global address. When the node to which the bridge controller 114 belongs is accessed as a target node, the bridge controller 114 reads the node ID or the APID of the source of access request from the global address included in the access request packet received by the second input and output unit 118. The bridge controller 114 delivers the effective address designated by the access request packet to the multicore processor 120 along with the APID.

Like the controller 22 shown in FIG. 5, the bridge controller 114 confirms that a write operation is completed and guarantees the order by controlling the output of a notification packet using the result of confirmation, which are processes performed by the confirmation unit 24 and the order guaranteeing unit 25.

Inside the bridge controller 114 is located an IO address space for converting between effective addresses and IO addresses in the node 100. The IO address space is partitioned into one or a plurality of segments. Each segment is partitioned into one or a plurality of pages. For each page, the bridge controller 114 is provided with a register responsible for conversion. An aggregate of the registers is a register group 116. The conversion register provided in the bridge controller 114 include for each page the node ID of the access requesting node permitted to access the page or the APID representing the identification information of the access requesting application permitted to access the page, the physical addresses in the main memory 180 mapped into the page, etc.

Information for each page is written by the system program into the associated register included in the register group 116 via the IOIF 160.

A description will now be given of access between the nodes 100.

First, the operation of the accessing node 100 will be described.

The multicore processor 120 included in the node 100 accesses another node, i.e., a target node. For access, the multicore processor 120 issues an access request packet to the bridge 110. The access request packet includes the effective address of the application in the target node requested to be accessed. The access request packet is issued by the DMAC of one of the processing units included in the multicore processor 120.

The bridge controller 114 of the bridge 110 converts the effective address into a global address. In this system, the format of global address shown in FIG. 8 is used. More specifically, the global address obtained by the bridge 114 comprises the APID of the application requested to be accessed, the node ID of the target node, and the effective address in the target node. The node ID of the source node requesting the access is also introduced in the access request packet.

The switch 80 reads the node ID included in the access request packet designating the global address and transfers the access request packet to the target node designated by the node ID.

In performing access for a write operation, the multicore processor 120 issues a notification packet after issuing a write packet to notify the target node that the write operation is done. In performing write operations in succession, the processor 120 issues write packets in succession and issues a notification packet subsequent to the last write packet. The multicore processor 120 appends a "fence" attribute, which requests that the notification packet be output after the write operations by the preceding write packets are completed, to the notification packet before outputting the packet to the bridge 110.

The bridge controller 114 of the bridge 110 generates a confirmation packet for reading 0 bytes after outputting each write packet. The bridge 114 outputs the confirmation packet thus generated via the second input and output unit 118. The bridge controller 114 confirms that the write operation is completed by receiving acknowledgement indicating that the read operation has been performed.

Upon receipt of the notification packet having the "fence" attribute appended thereto from the multicore processor 120, the bridge controller 114 permits the notification packet to be output on the condition that the result of confirmation using the confirmation packet associated with the preceding write packet indicates that the write operation by the write packet issued prior to the notification packet (in the case where a plurality of write packets are issued in succession, all of the write packets) is completed.

A description will now be given of the operation of the node 100 accessed, i.e., the target node.

Upon receipt of the access request packet, the bridge 110 of the target node 100 uses the bridge controller 114 to read the node ID or the APID of the source of access request included in the access request packet. The bridge controller 114 converts the effective address included in the access request packet into an IO address.

The bridge 110 transmits the IO address thus obtained to the IOIF 160 of the multicore processor 120 along with the node ID or the APID of the source of access request.

Figure 12:
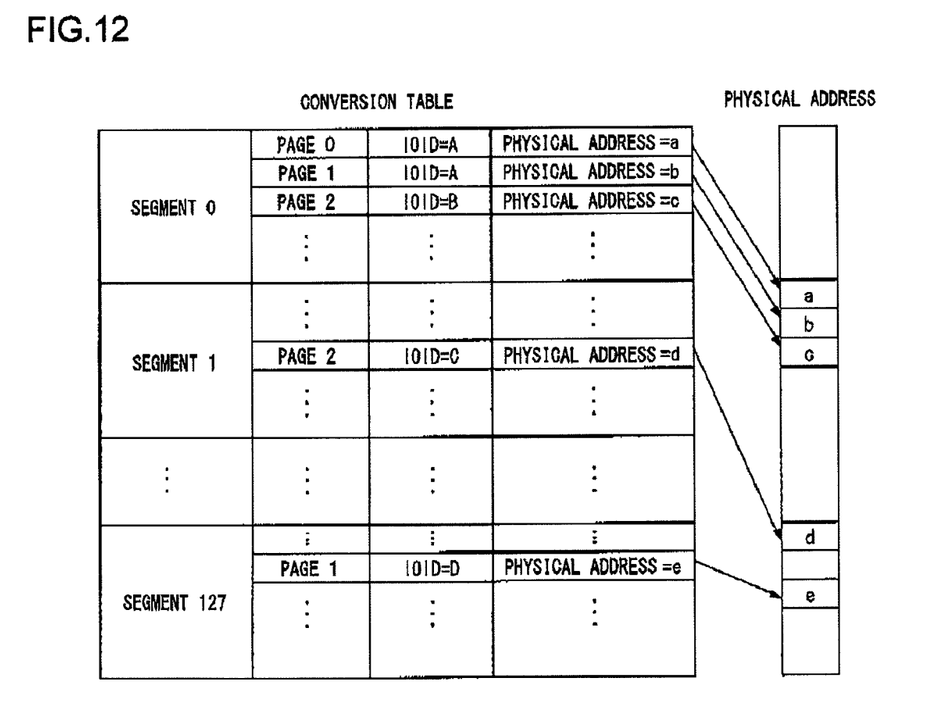
FIG. 12 shows a conversion table used in converting an effective address into a physical address and an exemplary result of conversion.

The IO controller 164 of the IOIF 160 converts the IO address into a physical address in the main memory 180. FIG. 12 shows a conversion table used in the conversion and an exemplary result of conversion.

The main memory 180 is partitioned into segments. Each segment is partitioned into pages of a predetermined page size. Given that the page size is 4 KB, the bits of a 36-bit IO address are defined such that IO Address [34:28]=segment, IO Address [27:12]=page, and IO Address [11:0]=offset.

As shown in FIG. 12, the conversion table maps a physical address space into each page included in a segment. Whether or not access is permitted is indicated by the permitted identification number IOID. The IOID denotes the node ID of the access requesting node permitted to access the corresponding physical address (space) or the APID representing the identification information of the access requesting application permitted to access the corresponding physical address.

The IO controller 164 refers to the conversion table to determine whether access to the segment number and the page number indicated by the IO address received from the bridge 110 is permitted. For example, if the node ID or the APID of the source of access request, received along with the IO address indicating "segment=1, page=2, and offset=0" is C, the IO controller 164 permits access to the physical address d since the conversion table maps the IOID=C into segment=1 and page=2, defining that access to the physical address d by the access requesting node identified by the node ID=C or by the access requesting application identified by the APID=C is permitted. In contrast, if the node ID or the APIA of the source of access request, received along with the IO address indicating "segment=127, page=1, and offset=0" is C, the IO controller 164 returns an error and denies access since the conversion table maps the IOID=D into segment=127 and page=1, defining that access by the access requesting node identified by the node ID=C or by the access requesting application identified by the APID=C is not permitted.

As will be learned from the conversion table, the same access requesting node or the same access requesting application (e.g., the access requesting node or application corresponding to IOID=A) is mapped into a contiguous area in the memory (area indicated by physical addresses a, b, etc.).

According to the structure described above, transparency of resources is achieved and ordering can be controlled in a multiprocessor system connected via a network.

While the information system shown in FIG. 9 includes only one switch, the aforementioned technology for ordering control can be applied to access between nodes in an expanded system including a plurality of switches.

In such a system, it is anticipated that commands and data are delivered via different routing paths, even if the same source node and the same target node are designated. Therefore, ordering of commands issued in succession cannot be guaranteed.

If restrictions on routing are completely eliminated or loss of packets is permitted as in the case of Ethernet (registered trademark) networks, the protocol would be difficult. Accordingly, a restriction is imposed on the system, requiring that packets designating the same source node and the same address are delivered along the same routing path. Additionally, a given routing path shall be invariably subject to the ordering rule of, for example, PCI Express (registered trademark).

By imposing such restrictions, completion of a preceding write command issued by the processor unit of a given node is guaranteed by allowing the same node to issue a read command designating the same address and to await acknowledgement.

When a processor unit is to transfer data using a plurality of write commands and issue a single notification command to indicate the completion of the write operations, the notification command need be issued after all of the previously designated write operations are completed. If the ordering is to be guaranteed and if the rule should be observed requiring that the read commands designating the same addresses as the write commands be completely executed, the read commands designating the same addresses as the previously issued write commands need be completely executed before issuing the notification command.

The bridge is implemented with the function of issuing, after a write command is issued, a read command designating the same address as the write command and configured to read 0 bytes. It is guaranteed that a command for which ordering is required (a command with a ordering flag) is issued after all of the previously issued read commands are completely executed. An ordering flag may be implemented in a user-definable area forming part of a register for address conversion.

Described above is an explanation based on an embodiment of the present invention. The embodiment is intended to be illustrative only and it will be obvious to those skilled in the art that various modifications to constituting elements and processes could be developed and that such modifications are also within the scope of the present invention.

For example, in the information processing system shown in FIG. 9, node-to-node access to an area allocated to a given application from a different application is prevented by using the application ID, namely, APID, as IOID. Alternatively, the node ID of the source of access, instead of the APID, may be used to prevent access to an area allocated to the node ID from another node.

In the embodiment described, the switch 80 is described as connecting PCI buses. Alternatively, a switch connecting buses conforming to a standard other than PCI may be used to form a network.

INDUSTRIAL APPLICABILITY

The present invention is applicable to a technology for allowing access from one node to another on a computer network.

The invention claimed is:

1. A bridge for routing a PCI-enabled input-output bus of a processor unit to a PCI-enabled input-output bus of a switching device via which a plurality of processor units are connected to each other, comprising:

an upstream port adapted to a global address space into which effective addresses of the processor units are mapped and which is shared by the plurality of processor units, the upstream port being operative to receive from the associated processor unit an access request packet designating an effective address of a target node represented by one of the plurality of processor units;

a controller provided with a converter operative to convert the effective address of the target node into a global address by appending to the effective address of the target node a node identification number identifying the target node and necessary for switching; and a downstream port operative to output the access request packet designating the global address to the switching device, wherein the controller is further provided with a confirmation unit operative to confirm, after an access request packet for a posted write operation is output and before the target node is notified that the posted write operation is completed, whether the posted write operation is completed in the target node, wherein a confirmation is made when the confirmation unit creates and outputs through the downstream port an access request packet for a non-posted read operation designating the global address specified by the access request packet for the posted write operation, and after the confirmation unit checks if the non-posted read operation is successfully completed, and wherein the controller is provided with an order guaranteeing unit operative to permit the output of a notification packet issued by the associated processor unit and configured to notify a target node that a posted write operation is completed, on the condition that confirmation is established that the execution of an access request packet prior to the notification packet and requesting the posted write operation in the target node is completed, and wherein the notification packet is a packet for initiating a process of reading data written by the access request packet for a posted write operation in the target node.

2. The bridge according to claim 1, wherein where the global address space is logically partitioned by using application identification numbers uniquely identifying distributed applications run on the plurality of processor units, the converter is operative to store an application identification number in an access request packet designating a global address.

3. The bridge according to claim 2, wherein when the downstream port receives, from a source node represented by one of the plurality of processor units, an access request packet designating the processor unit associated with the downstream port as a target node and designating an effective address of the target node, the converter retrieves an application identification number from the access request packet, and the upstream port delivers to the associated processor unit the application identification number retrieved from the access request packet along with the effective address of the associated processor unit designated in the access request packet.

4. An information processing system comprising:
a plurality of processor units;
a switching device operative to connect the plurality of processor units to each other; and
a bridge operative to route a PCI-enabled input-output bus of an associated processor unit to a PCI-enabled input-output bus of the switching device, wherein
the bridge comprises:
an upstream port adapted to a global address space into which effective addresses of the processor units are mapped and which is shared by the plurality of processor units, the upstream port being operative to receive from the associated processor unit an access request packet designating an effective address of a target node represented by one of the plurality of processor units;
a controller provided with a converter operative to convert the effective address of the target node into a global address by appending to the effective address of the target node a node identification number identifying the target node and necessary for switching; and
a downstream port operative to output the access request packet designating the global address to the switching device, wherein
the controller is further provided with a confirmation unit operative to confirm, after an access request packet for a posted write operation is output and before the target node is notified that the posted write operation is completed, whether the posted write operation is completed in the target node, wherein a confirmation is made when the confirmation unit creates and outputs through the downstream port an access request packet for a non-posted read operation designating the global address specified by the access request packet for the posted write operation, and after the confirmation unit checks if the non-posted read operation is successfully completed, wherein when the processor unit is a source node, the processor unit is operative to issue, after an access request packet for a posted write operation is issued, a notification packet for notifying a target node that the posted write operation is completed, when the processor unit is a target node, the processor unit is operative to read, after a notification packet is received, data written by a posted write operation indicated by the notification packet, the controller in the bridge of the source node is provided with an order guaranteeing unit operative to permit the output of a notification packet issued by the associated processor unit, on the condition that confirmation is established that the execution of an access request packet output prior to the notification packet and requesting a posted write operation in a target node is completed, wherein the notification packet is a packet for initiating a process of reading data written by the access request packet for a posted write operation in the target node.

5. An access control method adapted for an information processing system in which a plurality of PCI-enabled processor units are connected to a PCI-enabled switching device via a bridge, comprising:
where a global address space into which effective addresses of the processor units are mapped and which is shared by the plurality of processor units is established, receiving from the associated processor unit an access request packet designating an effective address of a target node represented by one of the plurality of processor units;
converting the effective address of the target node into a global address by appending to the effective address of the target node a node identification number identifying the target node and necessary for switching; and
outputting the access request packet designating the global address to the switching device, wherein
the converting comprises confirming, after an access request packet for a posted write operation is output and before the target node is notified that the posted write operation is completed, whether the posted write operation is completed in the target node, wherein a confirmation is made when a confirmation unit creates and outputs through a downstream port an access request packet for a non-posted read operation designating the global address specified by the access request packet for the posted write operation, and after the confirmation unit checks if the non-posted read operation is successfully completed, and wherein the converting comprises order guaranteeing operative to permit the output of a notification packet issued by the associated processor and configured to notify a target node that a posted write operation is completed, on the condition that confirmation is established that the execution of an access request packet output prior to the notification packet and requesting the posted write operation in the target node is completed, and wherein the notification packet is a packet for initiating a process of reading data written by the access request packet for a posted write operation in the target node.

* * * * *